Figure 4:
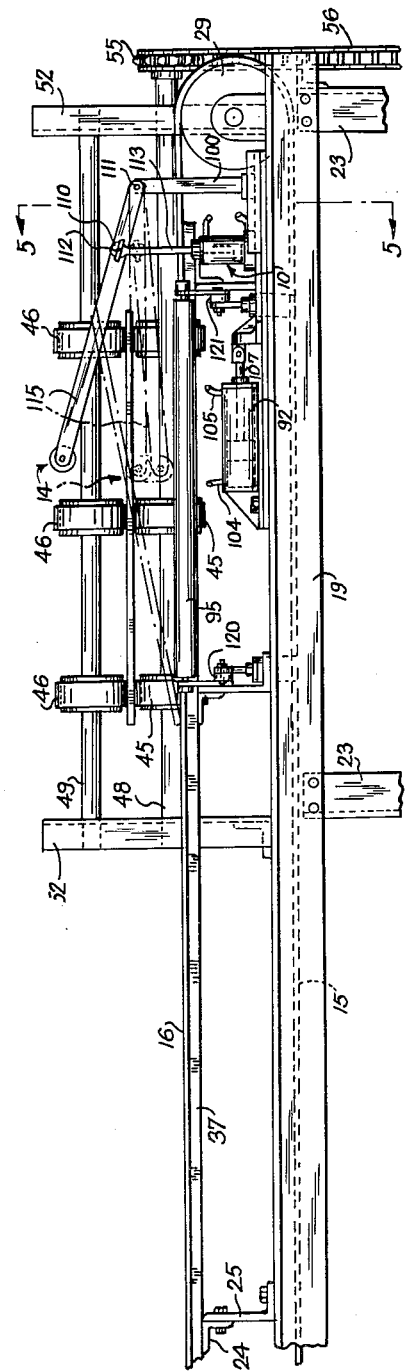

June 19, 1962  A. S. HOLDEN, JR  3,039,586
MATERIAL HANDLING EQUIPMENT AND METHOD
Filed Dec. 14, 1959  3 Sheets-Sheet 1
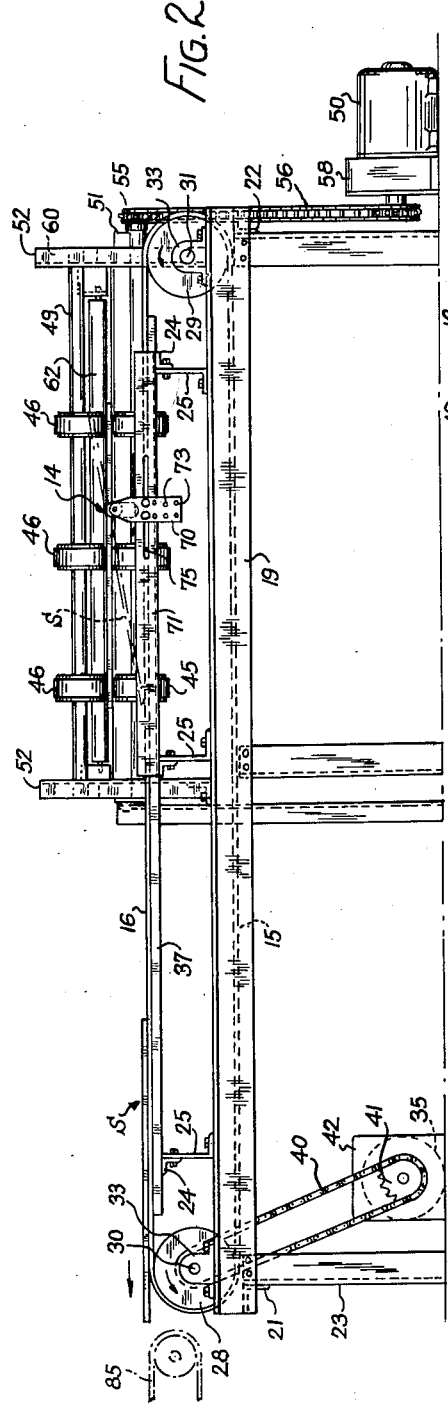
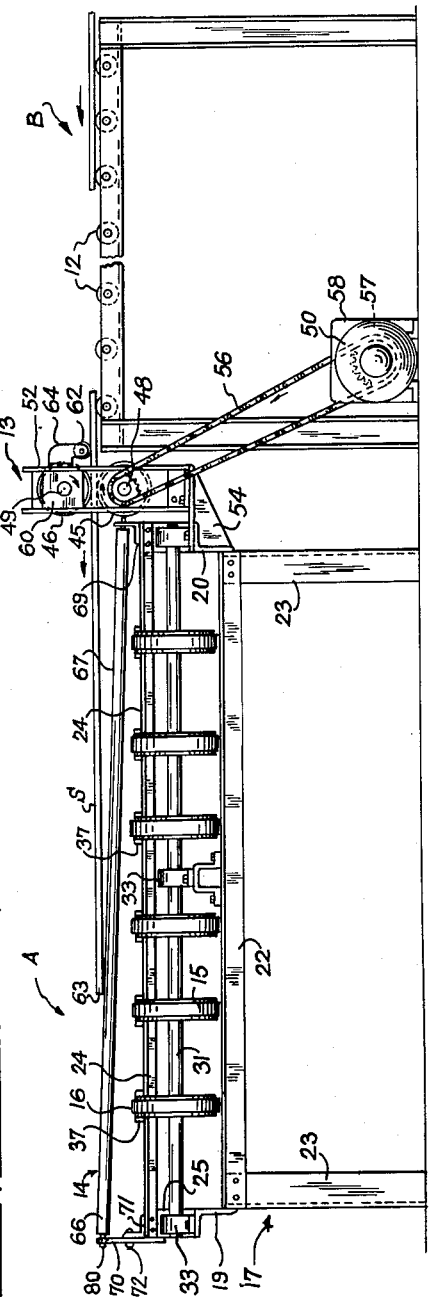
INVENTOR.
ARTHUR S. HOLDEN JR.
BY Hudson, Boughton,
Williams, David Hoffmann
ATTORNEYS

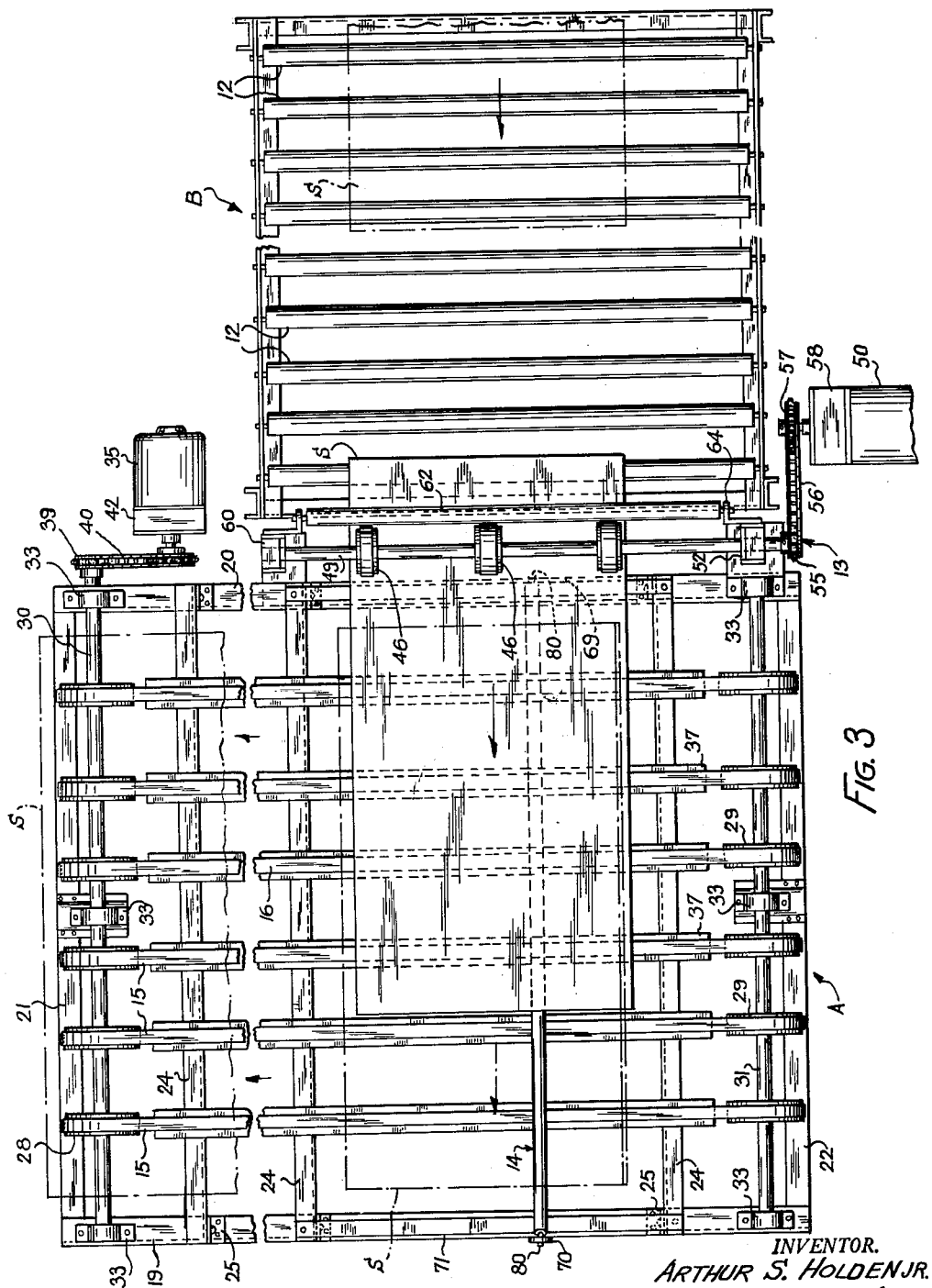

June 19, 1962  A. S. HOLDEN, JR  3,039,586
MATERIAL HANDLING EQUIPMENT AND METHOD
Filed Dec. 14, 1959  3 Sheets-Sheet 3

INVENTOR.
ARTHUR S. HOLDEN JR.
BY Hudson, Boughton,
Williams, David & Hoffmann
ATTORNEYS United States Patent Office 3,039,586
Patented June 19, 1962

3,039,586
MATERIAL HANDLING EQUIPMENT AND METHOD
Arthur S. Holden, Jr., Painesville, Ohio, assignor to The Coe Manufacturing Company, Painesville, Ohio, a corporation of Ohio
Filed Dec. 14, 1959, Ser. No. 859,286
7 Claims. (Cl. 198—20)

This invention relates to material handling methods and equipment, and more particularly to a novel method and conveyor or transfer apparatus for handling large boards or sheets of rigid or semi-rigid material such as fibreboard, plasterboard, veneer, plywood, or the like in the manufacturing and warehousing thereof.

In the handling of material in the form of large sheets, including fibreboard, plasterboard, plywood and the like, it is often desirable or necessary when conveying the sheets or boards between desired locations to make a corner or change in the direction of travel of the sheets to save floor space and/or to permit more efficient placement of various machines performing sequential operations on the material. It is also desirable at times to have elongated boards or sheets disposed in end-to-end relation for one operation and in side-by-side relation for a subsequent operation thus necessitating a partial rotation of the boards or sheets between operations.

One of the principal objects of this invention is the provision of a novel method of conveying or transferring large sheets or boards of the above mentioned character at high speed and changing their direction of travel during their movement from one place to another. The invention also contemplates the provision of a novel and improved apparatus for practicing the method, which apparatus is capable of receiving sheets or boards delivered thereto in a first direction of travel and changing the direction of travel of some or all of the sheets or boards as they pass therethrough to a direction transverse to the first direction.

Another object of the invention is the provision of improved material handling apparatus including means for moving or feeding large sheets of material traveling at high speed in one direction onto a conveyor for carrying the sheets in another direction, which apparatus has a skid or guide bar for arresting the movement of the sheets in the one direction and arranged to permit the arrested sheets to tip or rock into engagement with the conveyor for movement therewith to a subsequent operation.

Still another object of the present invention is the provision of novel and simple conveyor apparatus for changing the direction of travel of either stiff or flexible sheets and for reorienting the relative positions of the sheets, which apparatus has feed roll means for advancing each sheet in a first direction of travel onto a relatively stationary arresting bar which may be inclined and adjustably positioned in spaced relation to a conveyor having a surface traveling transverse to the first direction of travel of the sheets, the arresting bar having its longitudinal axis arranged to lie to one side of the center-lines of the sheets so that each sheet, upon being released by the feed roll means, will be arrested by the bar and tip under the influence of gravity into engagement with the moving surface of the conveyor to be carried away thereby.

Figure 5:
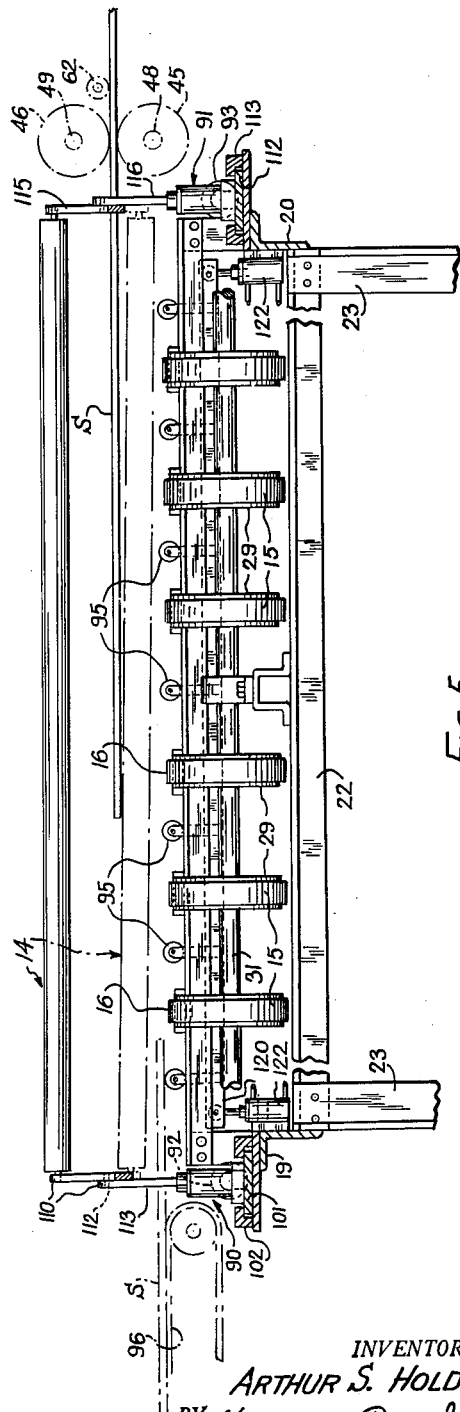

The invention resides in certain method steps, constructions and combinations and arrangements of parts, and further objects and advantages of the invention will be apparent to those skilled in the art to which it pertains from the following description of the preferred practice and embodiment described with reference to the accompanying drawings forming a part of this specification, and in which:

FIG. 1 is a side elevational view of material handling apparatus embodying this invention;
FIG. 2 is an end elevational view of the apparatus of FIG. 1;
FIG. 3 is a plan view of the material handling apparatus;
FIG. 4 is a fragmentary side view of a modified form of apparatus embodying this invention, and
FIG. 5 is a fragmentary end view of the apparatus of FIG. 4 with parts broken away along line 5—5 thereof.

Although the material handling apparatus embodying the present invention which is shown in the drawings and described hereafter is designed to be useful in transferring or conveying large sheets of somewhat flexible solid materials such as plasterboard, plywood, or fiberboard, the invention may be otherwise embodied and/or other materials handled. Because of this the preferred embodiments shown will be described with general reference to the handling of "sheets S."

The material handling equipment, illustrated in FIGS. 1–3 and embodying the invention, includes a conveyor means B for delivering the sheets S to equipment A. The conveying means B shown includes a plurality of rotating rollers 12. The sheets S are advanced along the rollers 12 in one direction of travel and thence into the equipment or apparatus A by feed roll means 13, in which equipment or apparatus A, the sheets are advanced or propelled along a guide bar 14 which will be more particularly described hereafter and which in addition to supporting the leading ends of the sheets serves to brake or arrest the movement of the sheets S when released by the feed roll means 13. The apparatus A includes conveyor means here shown as a plurality of conveyor belts 15 which present carrying or transfer reaches or surfaces 16 having a direction of travel transverse to that imparted to the sheets by the conveyor B.

The guide and/or arresting bar 14 is so positioned in relation to the feed roll means 13 and the upper reaches or surface 16 of the conveyor belts 15 that the sheets S will, at the proper time, tip about the longitudinal axis of the guide bar in the manner shown in dot-and-dash lines in FIG. 2. The tipping of the sheets S results in their engagement with the moving reaches 16 of the belts 15 which serve to carry the sheets S off of the guide bar 14 conveying them away in a direction transverse to their motion upon entering the apparatus.

The equipment or apparatus A comprises a rectangular frame, generally indicated at 17, having horizontal end rail portions 19 and 20 and connecting side rail portions 21 and 22. The rail portions are supported by vertical legs 23, and a plurality of transverse bars 24 are supported on the end rails 19 and 20 by brackets 25, the bars 24 extending parallel to the side rails 21, 22.

The conveyor belts 15 are arranged in parallel relation for movement around sets of sheaves or pulleys 28 and 29 mounted on shafts 30 and 31 respectively. The shafts 30 and 31 are conveniently mounted for rotation by a plurality of bearing blocks 33 mounted on the frame 17, and the shaft 30 is driven by a motor 35 to move the upper course of the belts 15 from right to left as viewed in FIG. 2.

Each of the belts 15 is supported in its upper course by a beam or plank 37 mounted on the previously mentioned transverse bars 24. A sprocket 39 is secured to the shaft 30, and together with a chain 40 forms part of the shaft driving connection with the motor 35, the motor being arranged to rotate a chain drive sprocket 41 through a suitable reduction gear means 42.

The feed roll means 13 of the apparatus A comprises a plurality of vertically stacked rollers or pinch rolls 45, 46 mounted on shafts 48 and 49 respectively for rotation therewith. The shaft 48 carrying the rolls 45 is driven from a motor 50 and is journaled in bearing blocks 51 which are secured in upright channel shaped brackets 52. The brackets 52 are located adjacent the end rail 20 of the frame 17 and are supported thereon by bracket arms 54. The shaft 48 carries a sprocket 55 which is connected by a chain 56 to a drive sprocket 57 arranged for rotation by the motor 50 through a suitable reduction gearing housed at 58.

The pinch rolls 45, 46 are preferably rubber covered and the upper rolls 46 are rotatable by the driven lower rolls 45. The shaft 49, carrying the rolls 46, is journaled in bearing blocks 60 which are adapted to slide vertically in the upright channel shaped brackets 52. Although the shaft 49 may be biased downwardly by springs or the like it is here shown as being downwardly urged by its own weight and that of the rolls 46 and bearing blocks 60 so as to yieldingly engage the sheets S as they are received from the conveyor B.

An auxiliary roll or guide roll 62 is disposed in advance of the pinch rolls 45, 46 and acts downwardly on the sheets S as they are passed through the pinch rolls 45, 46 to counter the weight of the leading edge portions 63 and other parts of the sheets S which are free, or without support, upon leaving the rolls 45, 46. The guide roll 62 is conveniently supported by bracket members 64 attached to the upright channel shaped brackets 52.

The guide bar 14 is disposed with its longitudinal axis lying substantially in the direction of travel of the sheets S as they are advanced by the conveyor B and by the feed roll means 13.

The bar 14 is spaced from the surfaces of the conveyor belts 15 and is preferably inclined with respect thereto, the end 66 remote from the feed roll means being elevated with respect to the end 67 of the bar. Adjustable bracket means are provided for the bar 14 including a bracket 69 for the lower end 67 and a bracket 70 for the elevated end 66. The bracket 70 is secured to a horizontal member 71 as by bolts 72, there being a plurality of sets of holes 73 provided for adjustment in the elevation of the end 66 of the bar 14. The member 71 is provided with a slot 75 for adjusting the position of the bar 14 with respect to the centerlines of the sheets S as they come from the feed roll means 13.

As the left-hand end of the bar 14, as viewed in FIG. 3, is raised the bar 14 will offer greater resistance to the movement of material fed thereto by the conveyor B, and the distance that the leading ends of the material must drop before engaging the belts 15 will be increased. Assuming that the height of the right-hand end of the bar 14 above the belts 15 remains the same, a change in height of the left-hand end results in a change in the sequence and/or interval between the engagement of the respective ends of the far edge of the sheets being delivered to the belts 15. The end of any particular sheet striking the belts first, or engaging the belts first with sufficient friction to be carried along therewith, will be advanced thereby before the other end with the result that the attitude of the sheet can be regulated as it is delivered to the belts 15. Obviously either or both ends of the bar 14 may be made adjustable.

In a somewhat similar manner, the attitude of the sheets can be regulated as they are delivered to the belts 15 by changing the horizontal position of one end of the bar 14 relative to the other. If the left-hand end of the bar 14, as viewed in FIG. 2, is moved towards the top of the view, assuming the parts to be in the relative positions shown in FIG. 3, the left-hand end of a sheet on the bar 14 will be better balanced thereon, unless the end of the bar is moved beyond the centerline of the sheet, in which event the balance will be reversed. A better balance of one end of the sheet on the bar 14 will delay the transfer or delivery of that end of the sheet to the belts 15. It will also be apparent that the general or overall position of the bar 14 relative to the centerline of the sheets being transferred from the conveyor B to the belts 15 also has an effect on the transfer and orientation of the sheets on the belts 15. As the bar 14 is moved towards the top of FIG. 3, the sheets become better balanced thereon and their transfer to the belts is relatively slower, therefore, the interval between the engagement of one end of the sheet and the other with the belts 15 becomes longer, other conditions remaining the same.

The foregoing is a partial explanation of the operation of the preferred embodiment of the present invention, but is believed to be adequate to apprise a person skilled in the art of the possibilities of board orientation, etc., which can be accomplished by the use of the present invention.

As is best seen in FIG. 1, the leading edge portions 63 of the sheets S engage the inclined guide bar 14. The resulting frictional engagement and the inclined attitude of the bar 14 will arrest the motion of the sheets S as they are released, or propelled free of the pinch rolls 45, 46 of the feed roll means 13.

It will be observed from the illustrations in FIGS. 2 and 3, that the guide bar 14 is disposed to one side of the centerline of the sheets S. Since the center of gravity of each sheet S will be to that side of the bar 14 corresponding to the direction of travel of the upper reaches of the conveyor belts 15, the sheets S will tip or rock about the bar 14, or the longitudinal axis thereof, into engagement with the surfaces 16 of the belts 15 to be drawn thereby off of the bar 14 and carried away in a direction of travel transverse to that of the conveyor B.

To increase the arresting ability of the bar 14 the surface thereof may be roughened, and the elevation or inclination of the bar may be adjusted in the manner above described in accordance with the speed or velocity of the sheets S as they are propelled by the feed roll means 13. The vertical and horizontal adjustment of the end 66 of the bar 14 also may be adjusted to determine how square the sheets S are delivered to the cross belts 15.

The bar 14 may advantageously be rotatively pivoted as at 80 to the brackets 69 and 70 so that the sheets S may be pulled from the bar more easily by the belts 15. Also, the surfaces 16 of the belts may be roughened or otherwise treated to provide greater friction between the belts and the sheets S.

The sheets may be fed rapidly one after another from the conveyor means B, and it will be evident that their relative positions will be changed from an end-to-end to a side-by-side relationship as they pass through the apparatus A, or vice versa. The conveyor belts 15 transfer the sheets S, in their new direction of travel, to a subsequent processing operation or to another conveyor means 85 for further handling.

While the apparatus may include, other forms of feed means than the pinch rolls 45, 46, the latter are advantageous in the handling of more flexible sheets S. In this regard the pinch rolls hold the sheets in such a manner as to impart a certain amount of rigidity to the sheets, or a certain amount of resistance against flexing or bending about the bar 14 under the influence of their own weight and prematurely engaging the conveyor belts 15.

A modified embodiment of the invention is illustrated in FIGS. 4 and 5, in which parts having corresponding parts in the embodiment described above have corresponding reference characters.

The modification referred to provides for remote adjustment of the position of the skid bar 14 through the use of fluid pressure motors such as vertical pneumatic or hydraulic actuating cylinders 90, 91 and horizontal pneumatic or hydraulic actuating cylinders 92, 93. The modification also adapts the apparatus to permit the sheets S, advanced in their original direction of travel by the pinch rolls 45, 46, to continue in their original direction through the use of additional transfer or conveyor means such as vertically shiftable rollers 95, disposed between the transverse belts 15 and effective to transfer the sheets S to a conveyor 96, shown in FIG. 5, when the skid bar 14 is elevated into the position indicated in full lines in FIGS. 4, 5.

The cylinder 90 and a pivot post 100 are preferably carried by a horizontal slide 101 which is slidably retained in ways 102 mounted on the frame member 19. The horizontal cylinder 92, which is preferably double acting and has pressure fluid conduits 104, 105 extending therefrom, is secured to the member 19 and has its connecting rod 107 connected to the slide 101. A swing arm 110 is pivoted at 111 to the post 100 and at 112 to the connecting rod 113 of the vertical cylinder 90. The swing arm 110 supports one end of the skid bar 14 and serves to vertically position that end in response to actuation of the cylinder 90. Horizontal positioning of that end of the bar 14 is effected by the cylinder 92 which shifts the swing arm 110 and its supporting cylinder 90 and pivot post 100.

A similar arrangement is provided for positioning the other end of the bar 14. The cylinder 91 and a pivot post, like post 100, are carried by a slide 112 in ways 113 and are connected to a swing arm 115. The slide 112 is connected to the horizontal cylinder 93 for horizontal movement of the cylinder 91, the arm 115 and the end of the bar 14 connected thereto. The cylinder 91 has a connecting rod 116 and it will be recognized that when the connecting rods 113 and 116 are fully extended, the bar 14 will assume the elevated full line position of FIGS. 4 and 5 above the level at which the sheets are fed through the pinch rolls 45, 46.

The vertically shiftable rollers 95 are each supported at their respective ends by movable support members 120 and 121. The support members 120, 121 are connected at the ends thereof to the connecting rods of vertically operating fluid pressure motors or actuating cylinders 122 which serve to selectively shift the rollers 95 between upper or raised positions and lowered positions. The rollers 95 are illustrated in their raised positions in which their upper surfaces are above the upper surfaces 16 of the transverse belts 15. When lowered by the cylinders 122, the rollers 95 are below the upper course of the belts 15 and this is the position of the rollers when the apparatus is used with the bar 14 in the dotted line position of FIGS. 4 and 5.

It will be apparent that the sheets S will pass under the skid bar 14, when the latter is elevated in the above mentioned manner, and will drop onto the raised rollers 95 and be carried away by the conveyor means 96 with no change in direction. When the apparatus is operated at relatively high speeds, the motion of the sheets S will carry them over the rollers 95 to the conveyor means 96. For slower operation, however, the rollers 95 may be driven to deliver the sheets S to the conveyor means 96.

The cylinders 90, 91, 92 and 93 may be controlled through suitable valves during operation of the apparatus to vary the position of the skid or guide bar 14 to thereby accommodate changes in the speed of advance, spacing, sizes, etc., of the sheets S. If, for example, the speed at which the sheets are delivered to the apparatus is changed it could very well be advisable to change the inclination of the bar 14 to provide more or less resistance to their movement depending upon whether the change in speed is up or down. As previously explained, raising the far end of the bar 14, that is, the left-hand end, as viewed in FIG. 5, relative to the right-hand end, offers greater resistance to the movement of the sheets thereover, and vice versa. As also explained previously, as the bar 14 is moved towards the center of the sheets, the balance of the sheets thereon is improved. This delays their transfer to the belts 15 and can be used as a means for regulating the spacing between succeeding sheets. The position of the bar 14 can also be changed to accommodate sheets of different size, for example, narrower sheets and/or shorter sheets and/or lighter or heavier sheets. As an illustration, heavier sheets will have more inertia for a given speed than lighter sheets with the result that if the sheets are to be stopped along the bar 14 in the same position the height of the left-hand end of the bar 14 relative to the right-hand end of the bar will be higher for heavy sheets than for light sheets, etc. One or more of the cylinders 90, 91, 92, 93 may be made responsive to solenoid operated valves actuated by limit switches or the like arranged in the path of travel of the sheets S and effective to adjust the position of the bar 14 to correct misalignment of the sheets as they pass through the apparatus.

From the foregoing detailed description of the invention it will be apparent that the objects heretofore enumerated, as well as others, have been accomplished and that there has been provided a novel and improved apparatus for selectively making a corner or change in direction of travel of boards or sheets of material or permitting the sheets to continue with no change in direction. It will also be appreciated that the material handling equipment is simple yet rugged in construction, and will operate rapidly and efficiently for long periods of time with little attention and maintenance.

While the invention has been described with detailed reference to several embodiments thereof, it is understood that the invention is not limited to the particular constructions shown but rather the invention includes all such modifications, adaptations, and changes as are reasonably embraced by the scope of the claims hereof.

Having thus described my invention, I claim:

1. Sheet handling apparatus comprising feed means for moving rigid or semi-rigid sheets of material in a first path of travel having one direction, conveyor means for carrying sheets of material in a second path of travel having a direction transverse to said one direction, and guide bar means spaced above said conveyor means and disposed in said first path of travel, said guide bar means being arranged to receive sheets from said feed means and inclined upwardly with respect to said first path of travel, to arrest the motion of said sheets in said one direction, means for adjusting the inclination of said guide bar means, said guide bar means being disposed to one side of the center of said first path of travel whereby the arrested sheets will tip about said guide bar means and into engagement with said conveyor means for movement therewith in said transverse direction.

2. Sheet handling apparatus comprising feed means for moving rigid or semi-rigid sheets of material in a first path of travel having one direction, conveyor means for carrying sheets of material in a second path of travel having a direction transverse to said one direction, and guide bar means spaced above said conveyor means and disposed in said first path of travel, said guide bar means being arranged to receive sheets from said feed means and inclined upwardly with respect to said first path of travel to arrest the motion of said sheets in said one direction, means for adjusting the inclination of said guide bar means, pressure fluid actuated means operatively connected to each end of said guide bar means for adjusting the position of said guide bar means relative to said conveyor means, said guide bar means being disposed to one side of the center of said first path of travel whereby the arrested sheets will tip about said guide bar means and into engagement with said conveyor means for movement therewith in said transverse direction.

3. Sheet handling apparatus comprising feed means for moving rigid or semi-rigid sheets of material in a first path of travel having one direction, conveyor means for carrying sheets of material in a second path of travel having a direction transverse to said one direction, and guide bar means spaced above said conveyor means and disposed in said first path of travel, said guide bar means being arranged to receive sheets from said feed means and inclined upwardly with respect to said first path of travel to arrest the motion of said sheets in said one direction, means for adjusting the inclination of said guide bar means, pressure fluid actuated means operatively connected to each end of said guide bar means for adjusting the position of said guide bar means relative to said conveyor means, means operatively connected to each end of said guide bar means for selectively raising said guide bar means above said first path of travel, said guide bar means being disposed to one side of the center of said first path of travel whereby the arrested sheets will tip about said guide bar means and into engagement with said conveyor means for movement therewith in said transverse direction.

4. Sheet handling apparatus comprising feed means for moving sheets of material in a first path of travel having one direction, conveyor means having a horizontal moving surface for carrying sheets of material in a second path of travel having a direction transverse to said one direction, a bar having its longitudinal axis extending substantially in said one direction, fluid pressure motor means for adjustably positioning each end of said bar, said bar adapted to be inclined with respect to said moving surface and to one side of the center of said first path of travel for receiving and arresting said sheets for tipping thereof onto said conveyor means, and said bar being adapted to be positioned by said fluid motor means above the level at which said sheets are moved by said feed means for permitting said sheets to continue through said apparatus in said one direction.

5. Sheet handling apparatus comprising feed means for moving sheets of material in a first path of travel having one direction, conveyor means having a horizontal moving surface for carrying sheets of material in a second path of travel having a direction transverse to said one direction, a bar having its longitudinal axis extending substantially in said one direction, fluid pressure motor means for adjustably positioning each end of said bar, said bar adapted to be inclined with respect to said moving surface to one side of the center of said first path of travel for receiving and arresting said sheets for tipping thereof onto said conveyor means, and said bar being adapted to be positioned by said fluid motor means above the level at which said sheets are moved by said feed means for permitting said sheets to continue through said apparatus in said one direction and including vertically shiftable transfer means adapted to be positioned above said moving surface for aiding said sheets to continue in said one direction.

6. Sheet handling apparatus comprising feed means for moving rigid or semi-rigid sheets of material in a first path of travel having one direction, conveyor means for carrying sheets of material in a second path of travel having a direction transverse to said one direction, and guide bar means spaced above said conveyor means and disposed in said first path of travel, said guide bar means being arranged to receive sheets from said feed means and inclined upwardly with respect to said first path of travel to arrest the motion of said sheets in said one direction, means for relatively adjusting the ends of said guide bar means horizontally, said guide bar means being disposed to one side of the center of said first path of travel whereby the arrested sheets will tip about said guide bar means and into engagement with said conveyor means for movement therewith in said transverse direction.

7. Sheet handling apparatus comprising feed means for moving rigid or semi-rigid sheets of material in a first path of travel having one direction, conveyor means for carrying sheets of material in a second path of travel having a direction transverse to said one direction, and guide bar means spaced above said conveyor means and disposed in said first path of travel, said guide bar means being arranged to receive sheets from said feed means and inclined upwardly with respect to said first path of travel to arrest the motion of said sheets in said one direction, means for relatively adjusting the ends of said guide bar means vertically and horizontally, said guide bar means being disposed to one side of the center of said first path of travel whereby the arrested sheets will tip about said guide bar means and into engagement with said conveyor means for movement therewith in said transverse direction.

References Cited in the file of this patent
UNITED STATES PATENTS

| | | |
|---|---|---|
| 2,506,550 | Morrison | May 2, 1950 |
| 2,739,692 | Wallmann | Mar. 27, 1956 |